US009289826B2

(12) United States Patent
Morris et al.

(10) Patent No.: US 9,289,826 B2
(45) Date of Patent: Mar. 22, 2016

(54) TURBINE STATOR AIRFOIL ASSEMBLIES AND METHODS FOR THEIR MANUFACTURE

(71) Applicants: Mark C. Morris, Phoenix, AZ (US); Donald G. Godfrey, Phoneix, AZ (US); Harry Lester Kington, Scottsdale, AZ (US)

(72) Inventors: Mark C. Morris, Phoenix, AZ (US); Donald G. Godfrey, Phoneix, AZ (US); Harry Lester Kington, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 800 days.

(21) Appl. No.: 13/621,845

(22) Filed: Sep. 17, 2012

(65) Prior Publication Data

US 2014/0079540 A1 Mar. 20, 2014

(51) Int. Cl.
| | |
|---|---|
| *F01D 9/02* | (2006.01) |
| *B22F 3/105* | (2006.01) |
| *F01D 5/18* | (2006.01) |
| *B22F 5/04* | (2006.01) |
| *F01D 5/14* | (2006.01) |
| *F01D 9/04* | (2006.01) |
| *F01D 9/06* | (2006.01) |

(52) U.S. Cl.
CPC ............... *B22F 3/1055* (2013.01); *B22F 5/04* (2013.01); *F01D 5/189* (2013.01); *F01D 9/02* (2013.01); *F01D 5/147* (2013.01); *F01D 5/187* (2013.01); *F01D 9/041* (2013.01); *F01D 9/065* (2013.01); *F05D 2230/22* (2013.01); *F05D 2230/31* (2013.01); *F05D 2260/20* (2013.01); *Y02T 50/676* (2013.01); *Y10T 29/49323* (2015.01)

(58) Field of Classification Search
CPC ........... F01D 9/02; F01D 5/187; F01D 5/188; F01D 5/189; F01D 25/12; F01D 5/147; F05D 2230/22; F05D 2230/31; F05D 2260/20; Y02T 50/676; B22F 3/1055; B22F 5/04
See application file for complete search history.

(56) References Cited

U.S. PATENT DOCUMENTS

| | | | |
|---|---|---|---|
| 5,640,667 A | * | 6/1997 | Freitag et al. .................. 419/31 |
| 7,435,056 B2 | | 10/2008 | Liston |
| 7,560,065 B2 | | 7/2009 | Troitski et al. |

(Continued)

FOREIGN PATENT DOCUMENTS

| | | |
|---|---|---|
| GB | 2452026 A | 2/2009 |
| GB | 2465181 A | 5/2010 |

OTHER PUBLICATIONS

Vaezi, M., et al.: "Integration of Reverse Engineering and Rapid Technologies for Rapid Investment Casting of Gas Turbine Blades" Virtual and Physical Prototyping, vol. 6, Issue 4, 2011, Taylor & Francis Group.

*Primary Examiner* — Ninh H Nguyen
(74) *Attorney, Agent, or Firm* — Ingrassia Fisher & Lorenz, P.C.

(57) ABSTRACT

In accordance with an exemplary embodiment, a method of manufacturing a stator airfoil assembly includes forming an interior wall of a stator airfoil using an additive manufacturing technique, forming an exterior wall of the stator airfoil using the additive manufacturing technique, and forming a plurality of internal ribs between the interior wall and the exterior wall using the additive manufacturing technique. A cooling air circuit is formed in a space between the interior wall and the exterior wall. Further, the interior wall, the exterior wall, and the internal ribs are formed simultaneously as an integral structure by using the additive manufacturing technique.

16 Claims, 9 Drawing Sheets

(56) References Cited

U.S. PATENT DOCUMENTS

| | | |
|---|---|---|
| 7,984,547 B2 | 7/2011 | Steinhardt |
| 8,061,142 B2 | 11/2011 | Kastrup et al. |
| 8,109,719 B2 | 2/2012 | Savage |
| 8,171,734 B2 | 5/2012 | McMasters et al. |
| 8,535,004 B2* | 9/2013 | Campbell ................ 416/97 R |
| 8,668,442 B2* | 3/2014 | Morris et al. ............. 415/134 |
| 2007/0163114 A1 | 7/2007 | Johnson |
| 2009/0255102 A1 | 10/2009 | McMasters et al. |
| 2009/0255118 A1 | 10/2009 | Kastrup et al. |
| 2009/0255119 A1 | 10/2009 | McMasters et al. |
| 2009/0255120 A1 | 10/2009 | McMasters et al. |
| 2009/0255261 A1 | 10/2009 | McMasters et al. |
| 2009/0255262 A1 | 10/2009 | McMasters et al. |
| 2010/0025001 A1 | 2/2010 | Lee et al. |
| 2010/0037614 A1 | 2/2010 | York |
| 2010/0104419 A1* | 4/2010 | Liang ...................... 415/115 |
| 2010/0263383 A1 | 10/2010 | York et al. |
| 2011/0311389 A1 | 12/2011 | Ryan et al. |
| 2012/0003086 A1 | 1/2012 | Morris et al. |
| 2012/0034101 A1 | 2/2012 | James et al. |
| 2012/0070307 A1 | 3/2012 | Poon et al. |
| 2012/0134793 A1 | 5/2012 | Wu et al. |
| 2013/0071562 A1* | 3/2013 | Szuromi et al. ........... 427/237 |

* cited by examiner

TURBINE STATOR AIRFOIL ASSEMBLIES AND METHODS FOR THEIR MANUFACTURE

TECHNICAL FIELD

The present invention generally relates to turbine engines, and more particularly relates to turbine engines with stator airfoil assemblies.

BACKGROUND

Gas turbine engines are generally known in the art and are used in a wide range of applications, such as propulsion engines and auxiliary power unit engines for aircraft. In a typical configuration, a turbine engine includes rows of stator airfoils and rotor blades disposed in an alternating sequence along the axial length of a generally annular hot gas flow path. The rotor blades are mounted on the periphery of rotor disks coupled to a main engine shaft. The stator airfoils are coupled to inner and outer endwalls and optimally direct hot combustion gases to the rotor blades, thus resulting in rotary driving of the rotor disks to provide an engine output.

The stator airfoils and rotor blades typically have arcuate shapes with generally concave pressure sides and generally convex suction sides extending axially in chords between opposite leading and trailing edges. During operation, the aerodynamic contours of the stator airfoils and rotor blades, and corresponding flow passages therebetween, are configured in an attempt to maximize energy extraction from the combustion gases. The complex three-dimensional (3D) configuration of the stator airfoils and rotor blades results in varied temperature and pressure distributions over the surfaces of the stator airfoils and rotor blades. These distributions exacerbate design and operational issues, particularly at higher temperatures. From the viewpoint of efficiency, it is desirable to operate the turbine at temperatures as high as possible. However, at these high temperatures, some conventional engines may have problems, particularly durability issues.

Accordingly, it is desirable to provide improved turbine components, particularly stator airfoil assemblies, and manufacturing methods therefor that enable operation at higher temperatures and/or improved durability. Furthermore, other desirable features and characteristics of the present invention will become apparent from the subsequent detailed description and the appended claims, taken in conjunction with the accompanying drawings and this background of the invention.

BRIEF SUMMARY

In accordance with an exemplary embodiment, a method of manufacturing a stator airfoil assembly includes forming an interior wall of a stator airfoil using an additive manufacturing technique, forming an exterior wall of the stator airfoil using the additive manufacturing technique, and forming a plurality of internal ribs between the interior wall and the exterior wall using the additive manufacturing technique. A cooling air circuit is formed in a space between the interior wall and the exterior wall. Further, the interior wall, the exterior wall, and the internal ribs are formed simultaneously as an integral structure by using the additive manufacturing technique.

In accordance with another exemplary embodiment, a stator airfoil assembly includes an airfoil exterior wall, an airfoil interior wall disposed within the airfoil exterior wall and defining a cooling air flowpath between the interior wall and the exterior wall, and a plurality of internal ribs separating the interior wall from the exterior wall. The airfoil exterior, the airfoil interior, and the internal ribs are formed as an integral structure without any weld or braze joints connecting the airfoil exterior, the airfoil interior, or the internal ribs.

In accordance with yet another embodiment, a stator airfoil assembly includes a hub endwall, a tip endwall, and an airfoil disposed between the hub endwall and the tip endwall, the tip endwall including an opening to allow cooling air to flow into the airfoil. The stator airfoil assembly further includes a flange of the tip endwall configured radially over the opening such that cooling air flows around the flange to enter into the airfoil.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the stator airfoil assemblies and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Disclosed herein is an enhanced stator airfoil assembly that is fabricated using a free-form manufacturing process for its production. Unlike known stator airfoil assemblies, embodiments of the present disclosure utilize a manufacturing process that incorporates a low energy density laser beam, referred to as "direct metal laser fusion" (DMLF), in a powder tank. This "free-form" or additive manufacturing process uses a small, focused beam to build a component by fusing one layer of powder to the fused layer of powder directly beneath it. The manufacturing methods disclosed herein utilize DMLF to build unique designs that are not practical and/or possible with prior technologies such as investment casting, where costly and time-consuming tooling is required.

Figure 1:
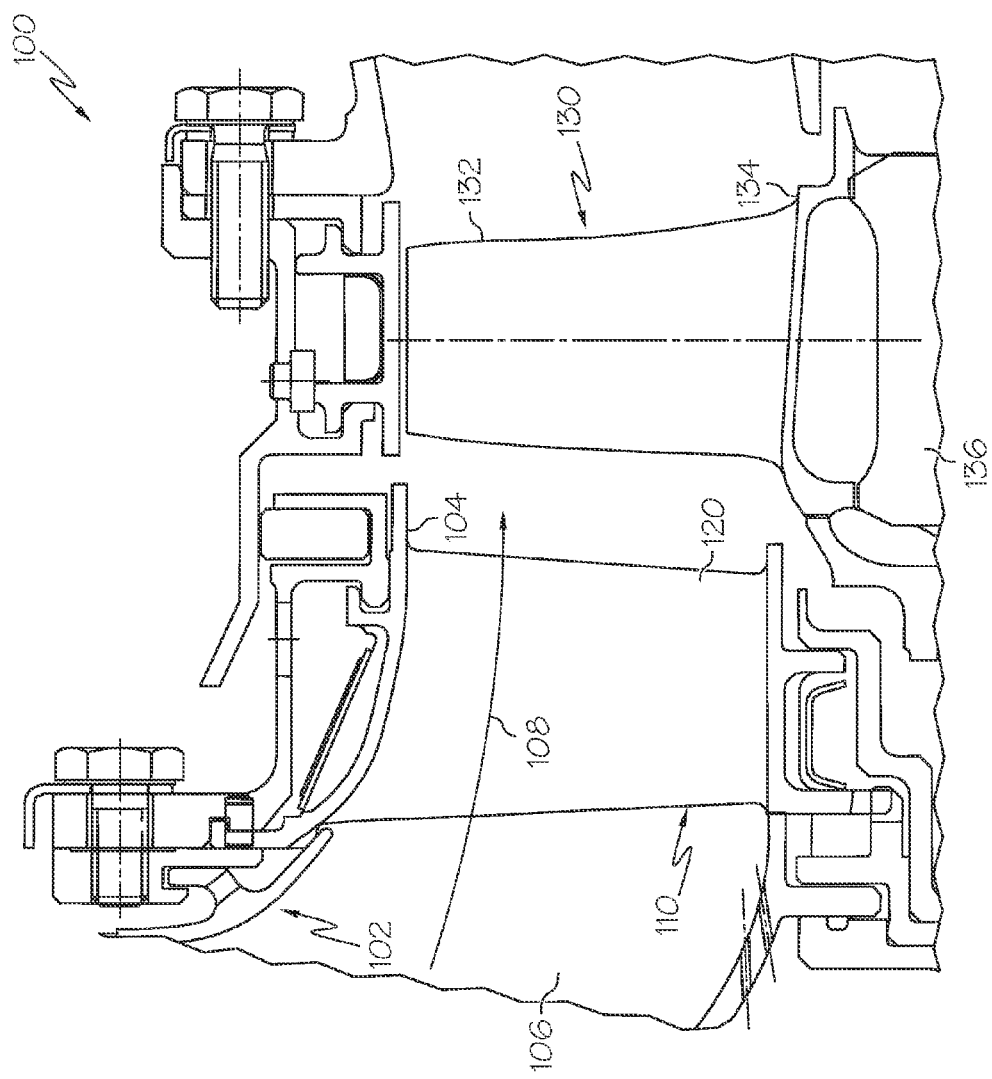
FIG. 1 is a partial cross-sectional view of a gas turbine engine assembly as previously known in the art.

FIG. 1 is a fragmented sectional view illustrating a portion of a conventional gas turbine engine assembly 100. The gas turbine engine assembly 100 has an overall construction and operation that is generally known to and understood by persons having ordinary skill in the art. In general terms, the gas turbine engine assembly 100 has a housing 102 with an annular duct wall 104 that defines a mainstream hot gas flow path 106 for receiving a flow of mainstream combustion gases 108 from an engine combustor (not shown). The housing 102 additionally houses at least one stator assembly 110 with stator airfoils or vanes 120 and at least one turbine rotor assembly 130 with turbine rotor blades 132. The combustion gases 108 flow past axially spaced circumferential rows of stator airfoils 120 and rotor blades 132. The rotor blades 132 of the turbine rotor assembly 130 project radially outward from a turbine rotor platform 134 that is coupled to a turbine disk 136, which in turn circumscribes a shaft (not shown). The combustion gases 108 drive the rotor blades 132 and the associated turbine rotor assembly 130 for power extraction. Other embodiments may be differently arranged.

Figure 2A:
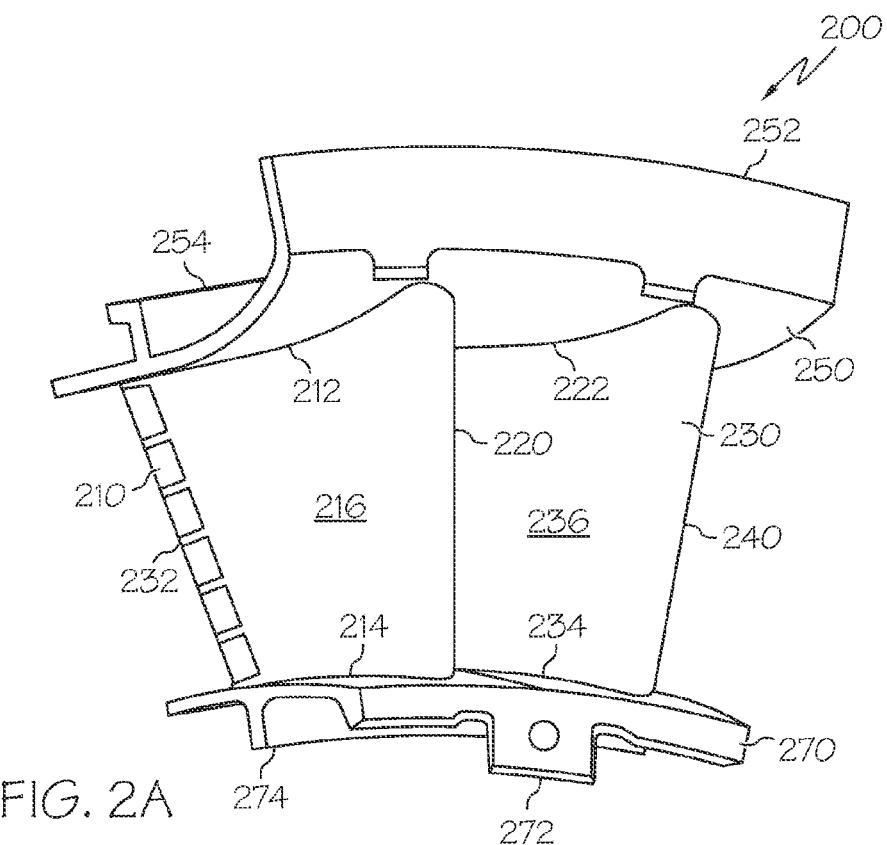
FIG. 2A is a partial front isometric view of a stator airfoil assembly as previously known in the prior art.
Figure 2B:
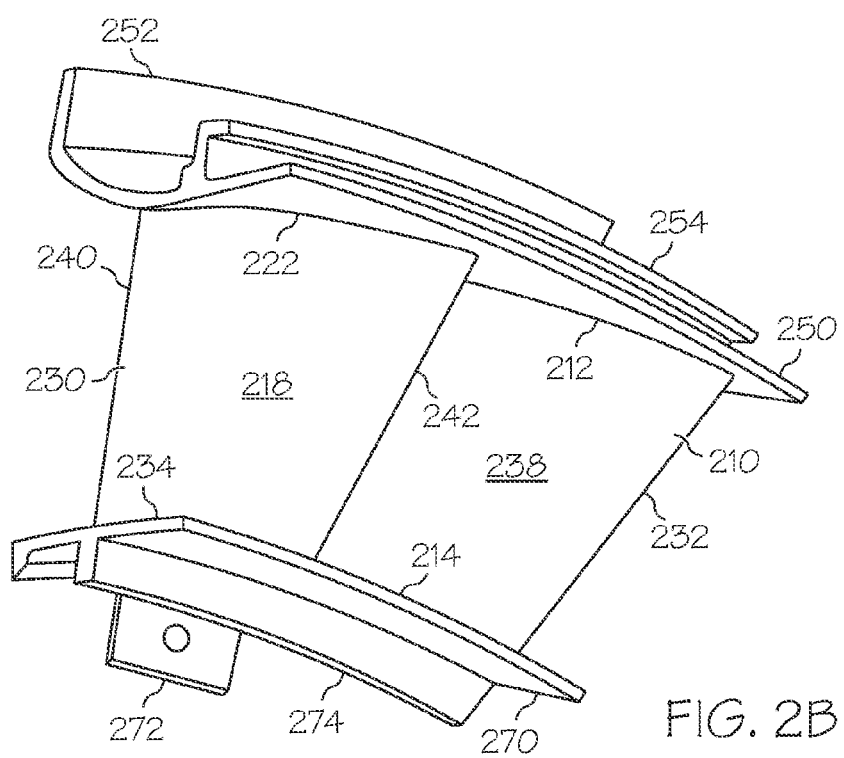
FIG. 2B is a partial rear isometric view of the stator airfoil assembly of FIG. 2A.

FIG. 2A is a partial front isometric view of a conventional turbine stator airfoil assembly 200, and FIG. 2B is a partial rear isometric view of the conventional turbine stator airfoil assembly 200 of FIG. 2A. As shown in FIGS. 2A and 2B, the turbine stator airfoil assembly 200 is manufactured with a plurality of stator airfoils, of which two airfoils 210, 230 are depicted in FIGS. 2A and 2B. The entire assembly forms an annular ring of the plurality of stator airfoils. As shown, the two stator airfoils 210, 230 are coupled at a respective outer edge 212, 222 to a tip endwall 250 and a respective inner edge 214, 234 to a hub endwall 270. The tip endwall 250 includes a forward rail or flange 252 and an aft rail or flange 254 for installation. The hub endwall 270 similarly includes a forward rail or flange 272 and an aft rail or flange 274. Each stator airfoil 210, 230 includes a generally concave pressure side 216, 236 and a laterally opposite, generally convex suction side 218, 238. Each pressure side 216, 236 and suction side 218, 238 extend from a leading edge 220, 240 to a trailing edge 232, 242.

Figure 3:
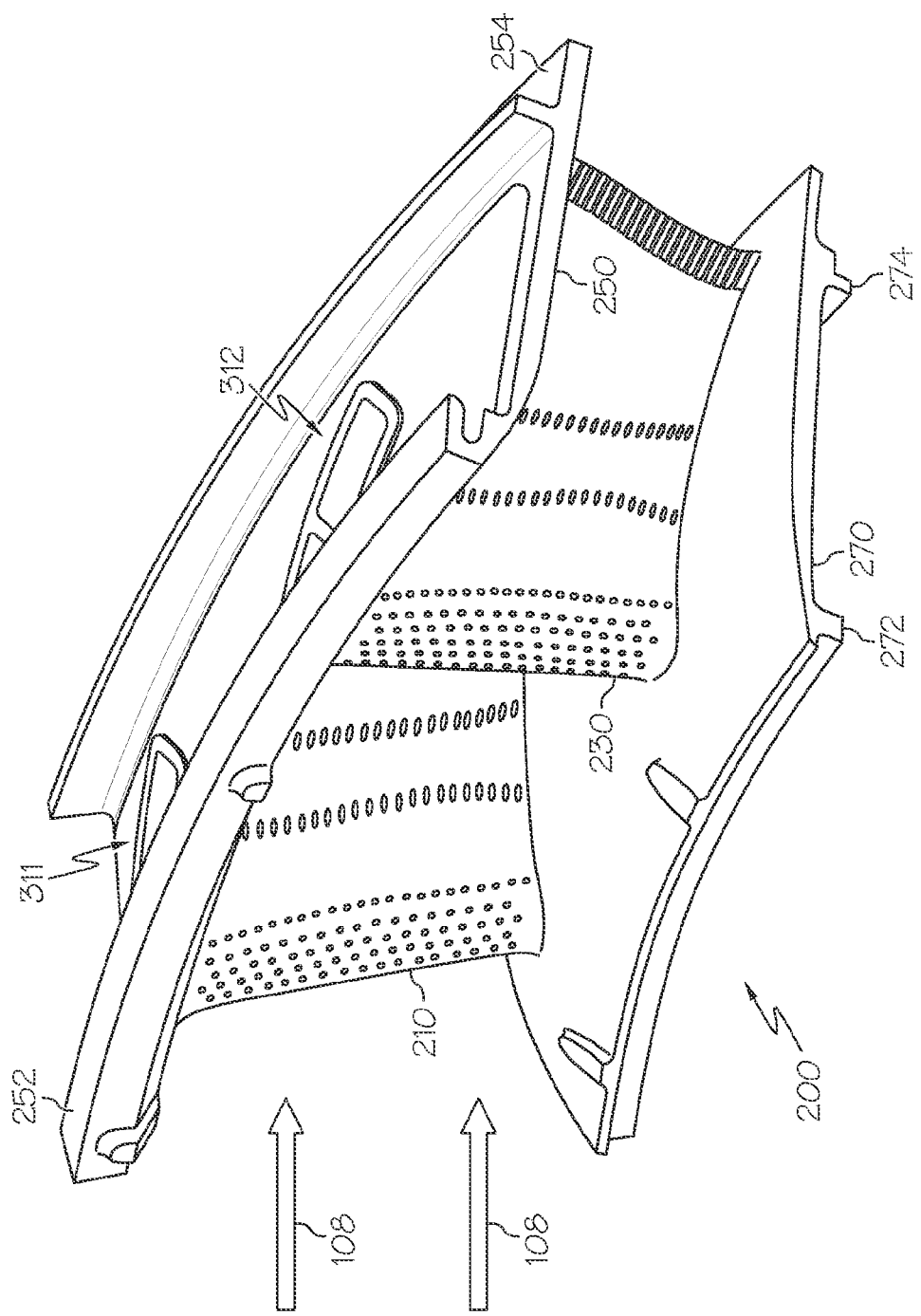
FIG. 3 is a top isometric view of a stator airfoil assembly as previously known in the art.

With reference now to FIG. 3, the stator airfoil (i.e., 210, 230) is formed, as is well known in the art, so as to have a hollow or semi-hollow interior. Impingement tubes, indicated generally by the arrows 311 and 312, are inserted into the hollow or semi-hollow airfoils 210, 230 for the purpose of providing a conduit for cooling air. During manufacture of the stator airfoil assembly 200, the impingement tubes 311, 312 are manually inserted into the hollow airfoils 210, 230, and brazed or welded in place. As such, it is known in the art that, using conventional manufacturing techniques, the forward flange 252 must be provided forward of the entry point for the impingement tubes 311, 312 in order to allow for sliding insertion thereof. This forward positioning results in the forward flange being provided directly in the path of the hot air flow 108 from the combustor, and significant thermo-mechanical stresses are undesirably encountered thereby. As shown in FIG. 3, elements 254, 270, 272, and 274 represent the same elements as described above with regard to FIGS. 2A and/or 2B.

Figure 4:
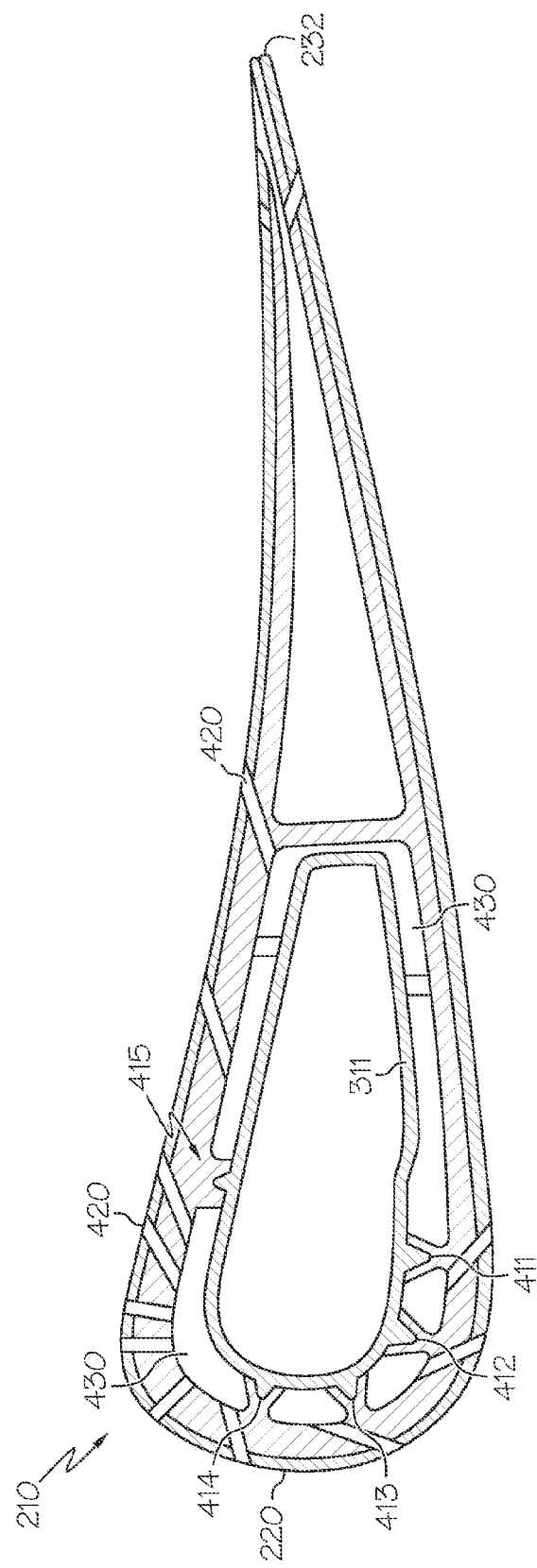
FIG. 4 is a top cross-sectional view through a stator airfoil illustrating assembly techniques previously known in the art.

With reference now to FIG. 4, conventional stator airfoils (e.g., 210) are cast with internal ribs 411-415 extending inwardly within the interior hollow portion of the airfoils. In some designs, as illustrated, the ribs extend around the leading edge (e.g., 220) of the stator airfoil. The ribs 411-415 provide additional cooling surface area and may guide the cooling air exiting from small holes (not shown) in the impingement tube 311 towards the more heat-critical surfaces of the stator airfoil. Eventually, the spent cooling air passes from the blade into the surrounding air stream through film cooling holes, slots or other apertures 420, as is well-known in the art. The ribs 411-415 create an internal space 430 between the inner surface of the blade and the outer surface of the impingement tube 311, enabling cooling air to be exhausted from the impingement tube 311 through the small holes therein. A supply of cooling air can be brought from a bypass feed through a plenum and into the impingement tube 311 from the radially outermost end. As illustrated in FIG. 4, the ribs 411-415 are provided in a generally "V"-shape that matingly fits with a ridge feature on the outer surface of the impingement tube 311. The V's and ridges are brazed or welded together to affix the impingement tube 311 within the stator airfoil 210. This manufacturing arrangement, however, constrains the possible airflow configurations between the impingement tube 311 and the inner wall of the stator airfoils such that optimal cooling arrangements are sacrificed in order to feasibly manufacture the stator airfoil assemblies using conventional manufacturing techniques. As shown in FIG. 4, element 232 represents the same element as described above with regard to FIGS. 2A and/or 2B.

Figure 5:
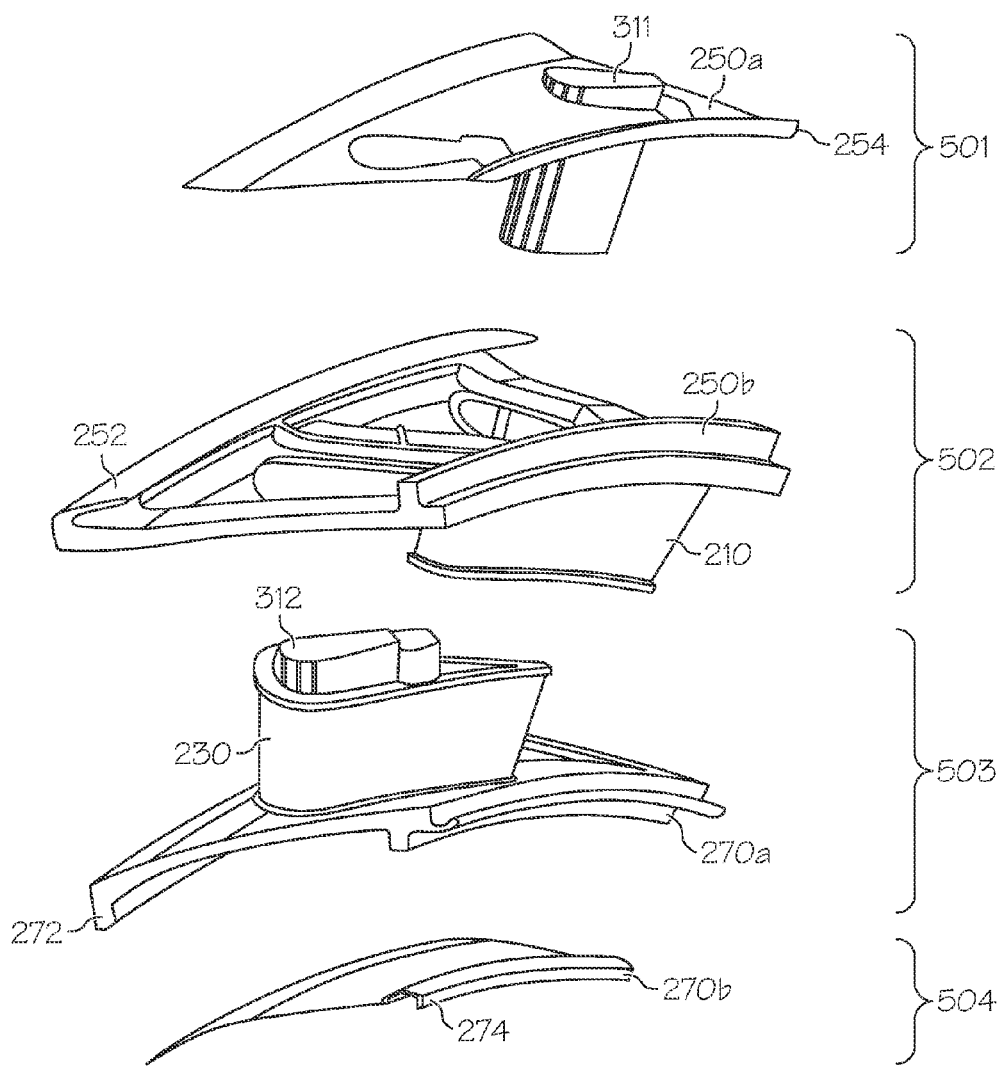
FIG. 5 illustrates an assembly process previously known in the art to assemble a stator airfoil assembly.

FIG. 5 illustrates generally the manufacturing process known in the art that is currently required to produce stator airfoil assemblies, and as noted above that restricts the possible airflow design configuration in favor of ease of assembly. The assembly is generally provided in, for example, four segments. A first portion 504 includes at least a first part of the hub endwall 270b and the aft rail or flange 274. A second portion 503 includes at least a second part of the hub endwall 270a, the forward rail or flange 272, and at least one airfoil (e.g., 230). A third portion 502 includes at least a first part of the tip endwall 250b, the forward rail or flange 252, and at least one airfoil (e.g., 210). Further, a fourth portion 501 includes at least a second portion of the tip endwall 250a, and the aft rail or flange 254. Generally, the impingement tubes 311, 312 are insertable into the airfoils (e.g., 230) during the assembly process, as shown in portions 503 and 501. Again, the positioning of the forward rail or flange 252 is undesirably limited by the requirement that the impingement tubes 311, 312 be insertable into the airfoils 210, 230 during the depicted assembly process.

Figure 6:
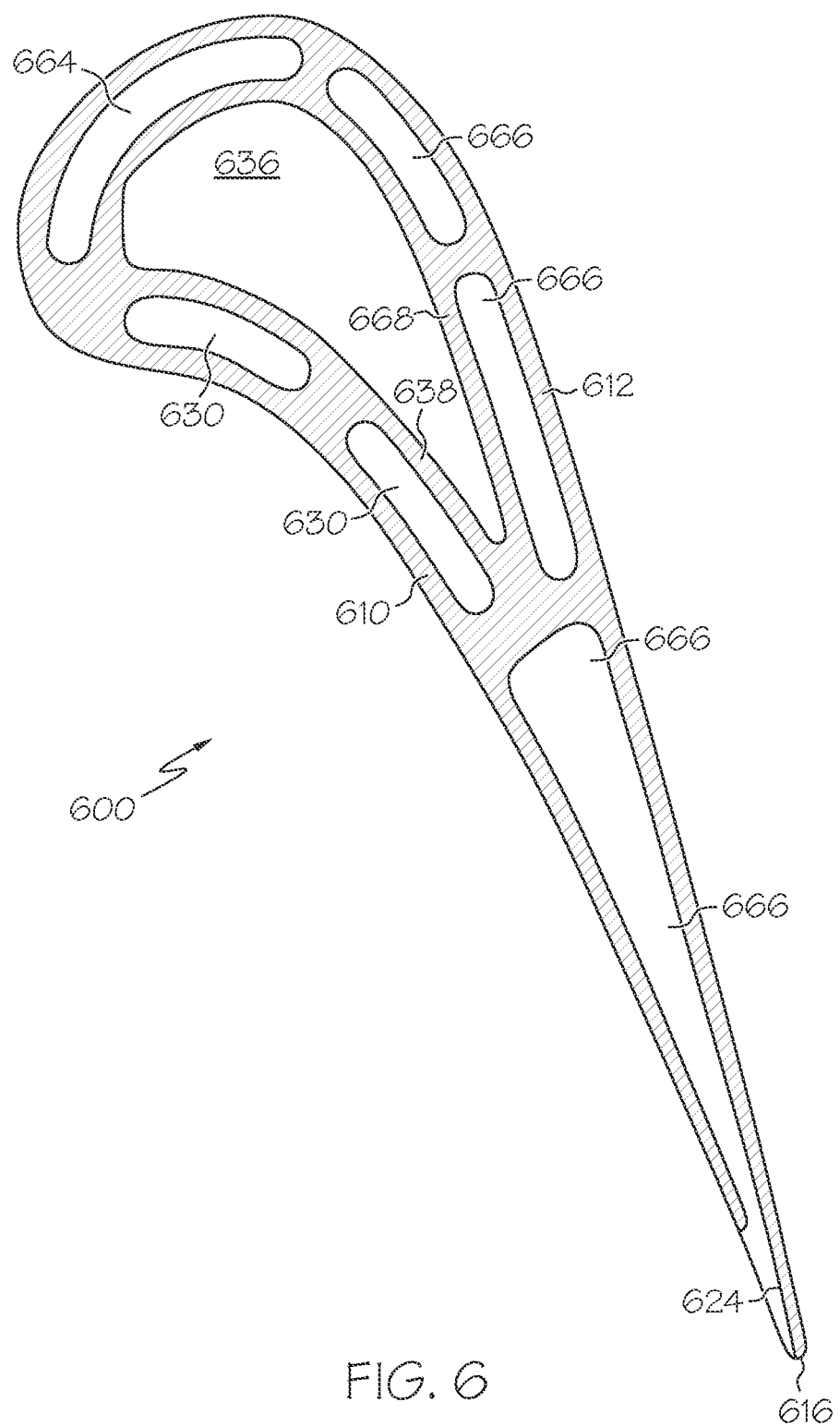
FIG. 6 is a top cross-sectional view through a stator airfoil in accordance with an embodiment of the present disclosure.

Embodiments of the present disclosure overcome the aforementioned drawback of the prior art by employing additive manufacturing techniques in combination with novel designs that are not possible using conventional manufacturing techniques. FIG. 6 depicts a stator airfoil 600 in accordance with an embodiment of the present disclosure. In contrast to the prior art airfoil depicted in FIG. 4, the stator airfoil 600 is formed using additive manufacturing techniques as an integral structure that does not include any weld or braze joints. As such, the complicated assembly process depicted in FIG. 5 is not required. FIG. 6 depicts an embodiment that includes the pressure side flow circuit 630 that is defined, in part, by the pressure side wall 610 and an interior wall 638. The interior wall 638 isolates the pressure side flow circuit 630 from the other flow circuits that may be provided. A suction side flow circuit is divided into a suction side forward flow circuit 664 and a suction side aft flow circuit 666. The suction side aft flow circuit 666 is defined by the suction side wall 612 and the interior wall 668. A center flow circuit 636 is defined by the interior walls 638, 668; thus formed in between the pressure and suction side flow circuits. The suction side flow circuit directs cooling air along the suction side wall 612 and out one or more of the trailing edge slots 624, provided at the trailing edge 616 of the airfoil 600.

As an integral structure, stator airfoil 600 does not require the insertion of impingement tubes. As such, the "V-shaped" ribs as discussed above with regard to FIG. 4 are not required. In this manner, the internal cooling air flow geometry is not restricted in a manner that must account for the sliding insertion of impingement tubes and the subsequent welding or brazing thereof.

Figure 7:
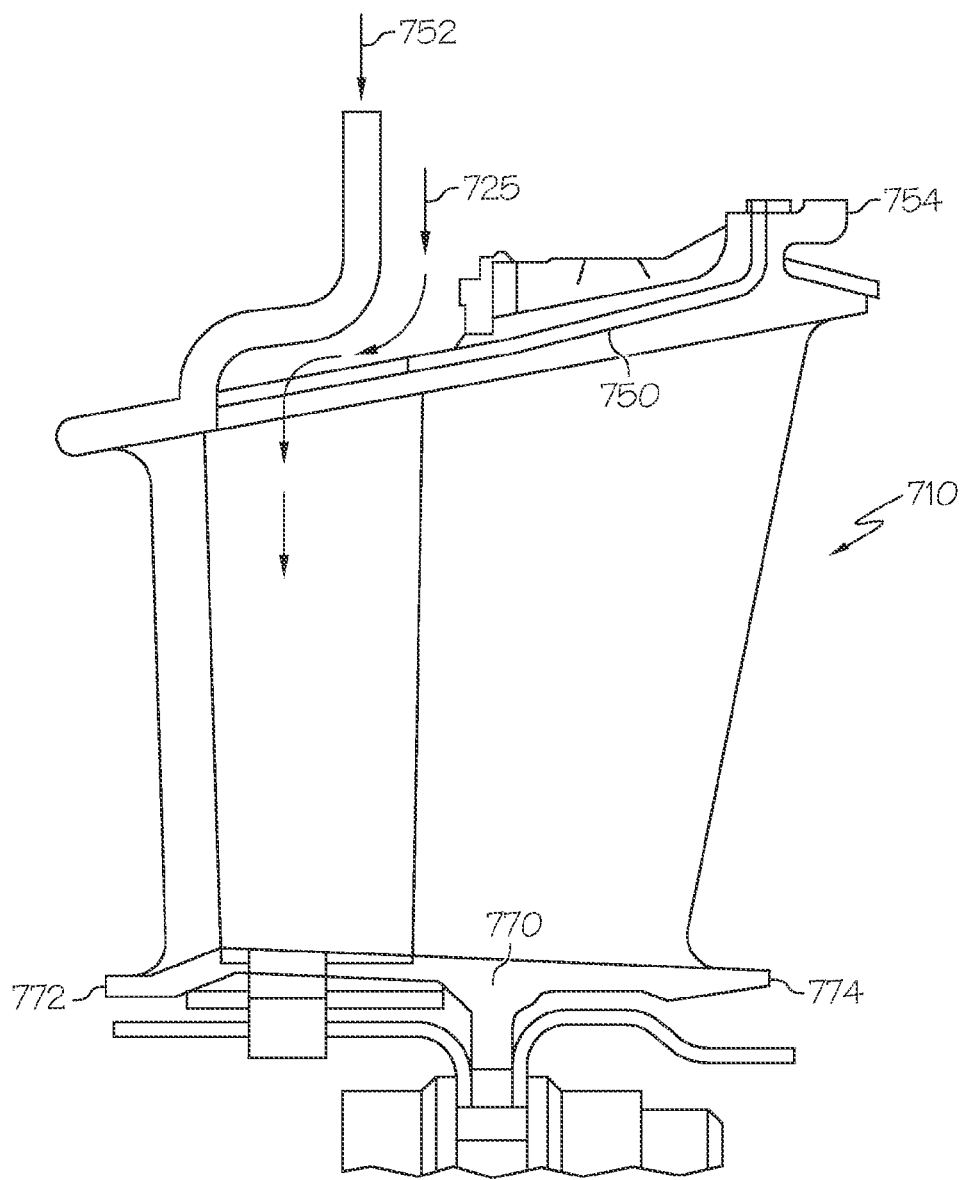
FIG. 7 is a partial cross-sectional view of a stator airfoil assembly in accordance with an embodiment of the present disclosure.

Furthermore, as shown in FIG. 7, the integral stator airfoil allows for preferential positioning and configuration of the forward flange 752 of the tip endwall 750. The aft flange 754 may also be preferentially configured. The depicted embodiment eliminates previous flange configuration requirements (see FIG. 3) by enabling the cooling air supply 725 to be delivered in a 3-dimensional way. Thus, the forward and aft flanges 752, 754 are now able to be moved to lower stress-inducing regions and be designed with 3-dimensional architecture for thermo-mechanical fatigue compliance. The forward (or aft) outer endwall flange 752, 754 may be positioned directly over the current air intake region and may be tapered in a 3-dimensional manner to allow for thermo-mechanical compliance with the stator airfoil structures. The impingement tube air delivery may be directed in low-loss arrangements from the forward, aft, or sides to provide cooling air to the airfoil. The flange thermal mass and mechanical stiffness/compliance is then optimized with the airfoil thermo-mechanical stresses to produce a superior life design. The resulting configuration is a lower cost, higher performance integral design that could not be produced with the prior art inserted tubes with brazed and/or welded approaches. As shown in FIG. 7, elements 710, 770, 772, and 774 correspond with like elements 210, 270, 272, and 274, respectively, as described above with regard to FIGS. 2A and/or 2B.

Figure 8:
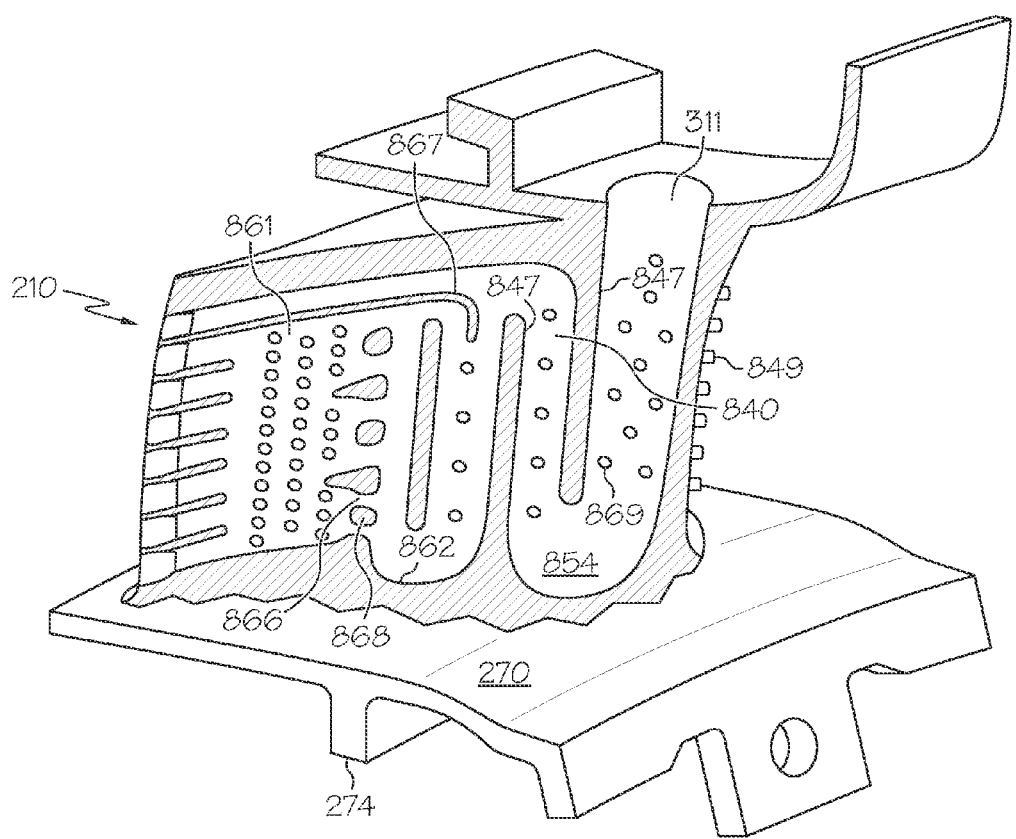
FIG. 8 is a cross-sectional view through a stator airfoil in accordance with an embodiment of the present disclosure.

In a further aspect of the present disclosure, the internal cooling circuits are not limited in configuration by the requirement that impingement tubes be inserted and welded into the airfoils. For example, as shown in FIG. 8 (in cutaway view), one or more unique cooling circuit architectures may be provided. FIG. 8 depicts an exemplary "serpentine" circuit configuration that would not be possible if an impingement tube were required to be inserted in the airfoil. As shown, the aft serpentine circuit includes pins 869, fins 847, and turning vane 867 with pin and fin optimization for pressure drop and heat transfer. The additive manufacturing techniques described herein allow for a unique aft serpentine bend 862 optimization to form one or more directional flow segments 840. As further shown, the aft serpentine circuit 854 utilizes conventional cross-over holes 866 to supply air to a pin fin bank 861, which then exits the spent air out of the trailing edge of the airfoil. Several pin fin bank features are employed which also make the inventive blade more advantageous than the prior art. Straightening vanes 868 impede the tendency of the air to initially pass vertically between pin rows. This improves the airflow distribution in the pin bank 861, reduces flow separation, and minimizes low heat transfer regions caused by recirculation zones. Additionally, pins 849 may be provided in a forward cooling circuit that is similarly designed to optimize heat transfer characteristics. As shown in FIG. 8, elements 210, 270, 274, and 311 represent the same elements as described above with regard to FIGS. 2A, 2B, and/or 3.

In general, it is expected that, based on the teachings herein, a person having ordinary skill in the art will be able to modify the stator airfoil assemblies as above to conform for use in a wide variety of applications, as the selection of size, shape, etc. of working components is generally considered to be within the level of skill of a person having ordinary skill in the art. As such, the various possible implementations of the stator airfoil assemblies should not be considered limited to any of the embodiments presented herein.

Greater detail regarding the additive manufacturing techniques noted above will now be provided, again with reference to the exemplary airfoil illustrated in FIG. 6 and more generally to the exemplary stator airfoil assembly illustrated in FIGS. 7 and 8. It will be appreciated that certain features of the presently described stator airfoil assemblies would be prohibitively expensive to manufacture using conventional manufacturing techniques. These include the integral airfoil structure, the optimally configured forward and aft flanges, and the optimally configured internal cooling circuits, among others. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base superalloys, low density titanium, and aluminum alloys. DMLS is discussed in greater detail below. Another technique includes electron beam melting (EBM) with titanium, titanium aluminide, and nickel base super-alloy materials. Still further, casting or metal injection molding (MIM) may be employed.

Figure 9:
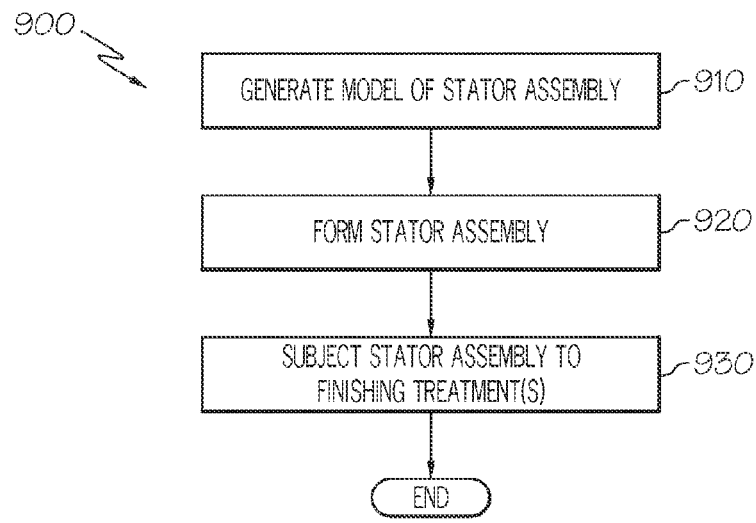
FIG. 9 is a flow diagram illustrating steps in a method of manufacturing a stator airfoil assembly in accordance with an embodiment of the present disclosure.

FIG. 9 is a flowchart illustrating a method 900 for manufacturing a stator airfoil assembly in accordance with an exemplary embodiment using, in whole or in part, additive manufacturing techniques. In the discussion that follows, "the stator airfoil assembly" will be referred to generically as representative of any or all portions of a stator airfoil in accordance with the present disclosure, including but not limited to the configurations shown in FIGS. 6-8, for example, that can be made using additive manufacturing techniques.

In a first step 910, a model, such as a design model, of the stator airfoil assembly, or component thereof, may be defined in any suitable manner. For example, the model may be designed with computer aided design (CAD) software and may include three-dimensional ("3D") numeric coordinates of the entire configuration of the stator airfoil assembly including both external and internal surfaces. In one exemplary embodiment, the model may include a number of successive two-dimensional ("2D") cross-sectional slices that together form the 3D component.

This design phase step 910 is performed in the following manner. During the design phase, the flow, thermal, and stress disciplines free the aerodynamicists to explore all airfoil design space options for enhanced performance, including airfoil shapes that preclude insertable impingement tubes for cooling the airfoil. The flow and thermal disciplines then optimize the aspect ratio of the impingement tube and internal cooling cavities to satisfy the required thermal distribution in the airfoil and endwalls for the allocated flow. Flanges for endwall sealing and retainment are configured in 3D optimized arrangement, using 3D structural analyses, to minimize thermal mass and optimize thermo-mechanical compliance with the airfoils for optimal life. Unlike the prior art, this embodiment enables airfoil cooling air to be drawn under the flanges (in 3D geometries) to heat the flanges during engine accels and cool the flanges during decels to minimize the airfoil-to-endwall transient temperature differences that result in stress and fatigue in the component. This also enables the relocation of the flanges away from stress-sensitive leading and trailing edge regions. This embodiment also enables the creation of sealed rib-cavities without brazing which meter the pressures in the individual cavities to provide optimized film cooling for each individual film row. The configuration is then analyzed with 3D transient thermal/stress/deflection analyses to optimize the thermo-mechanical fatigue life of the assembly. The resulting configuration is enabled without the prior art requirements of brazing/welding. The assembly is fabricated as a single unit, including the inner and outer impingement plates, the insert tubes (which are now integral with the airfoil fabrication), the airfoils, and the outer and inner endwalls.

In step 920 of the method 900, the stator airfoil assembly, or component thereof, is formed according to the model of step 910. In one exemplary embodiment, a portion of the stator airfoil assembly is formed using a rapid prototyping or additive layer manufacturing process. In other embodiments, the entire stator airfoil assembly is formed using a rapid prototyping or additive layer manufacturing process. Although additive layer manufacturing processes are described in greater detail below, in still other alternative embodiments, portions of the stator airfoil assembly may be forged or cast in step 920, for example, with a single-crystal structure.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the stator airfoil assembly in step 920. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above, and is a particularly preferred embodiment of this disclosure.

As such, in one exemplary embodiment, step 920 is performed with DMLF techniques to form the stator airfoil assembly. However, prior to a discussion of the subsequent method steps, reference is made to FIG. 10, which is a schematic view of a DMLF system 1000 for manufacturing the stator airfoil assembly, for example one or more components of the stator airfoil assembly as shown in FIGS. 6 through 8, in accordance with an exemplary embodiment.

Figure 10:
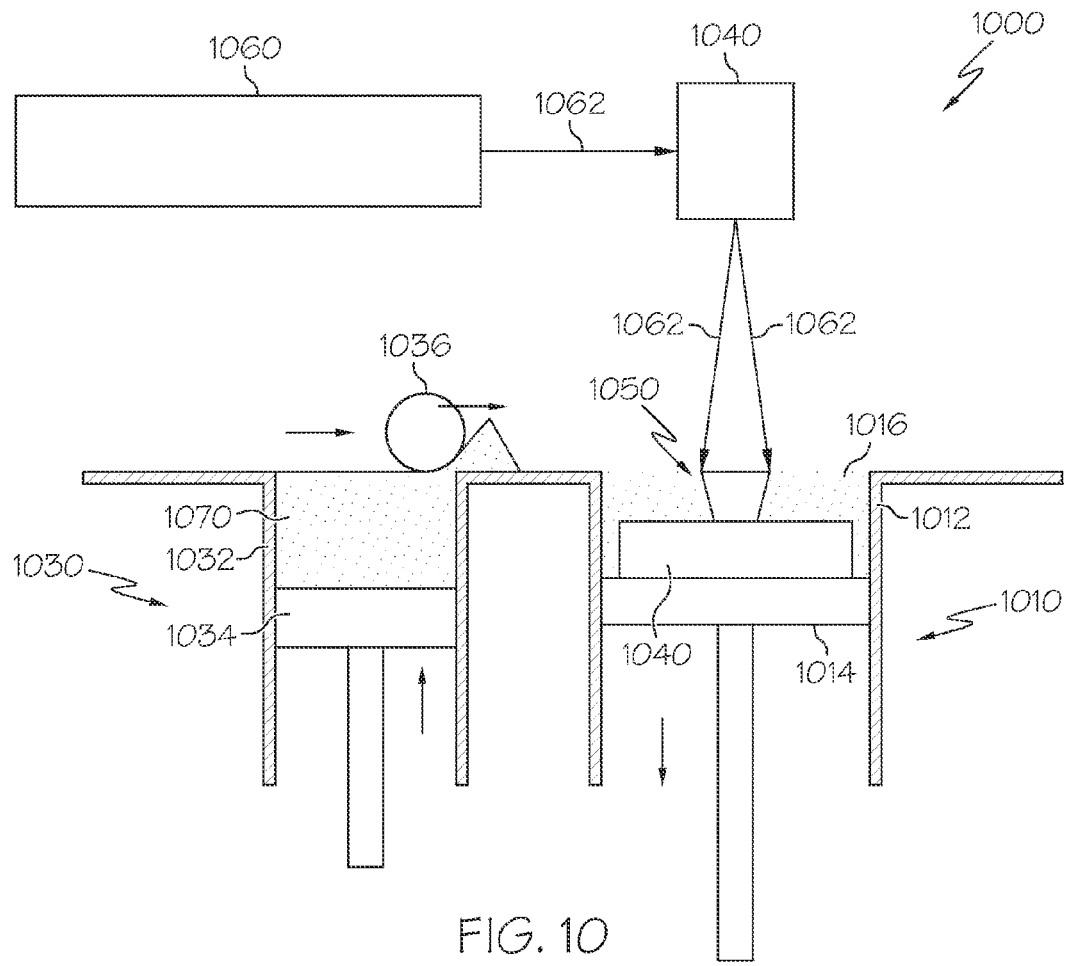
FIG. 10 is an exemplary additive manufacturing system suitable for use in manufacturing stator airfoil assemblies in accordance with an embodiment of the present disclosure.

Referring to FIG. 10, the system 1000 includes a fabrication device 1010, a powder delivery device 1030, a scanner 1040, and a laser 1060 that function to manufacture the article 1050 (e.g., the stator airfoil assembly, or a component thereof) with build material 1070. The fabrication device 1010 includes a build container 1012 with a fabrication support 1014 on which the article 1050 is formed and supported. The fabrication support 1014 is movable within the build container 1012 in a vertical direction and is adjusted in such a way to define a working plane 1016. The delivery device 1030 includes a powder chamber 1032 with a delivery support 1034 that supports the build material 1070 and is also movable in the vertical direction. The delivery device 1030 further includes a roller or wiper 1036 that transfers build material 1070 from the delivery device 1030 to the fabrication device 1010.

During operation, a base block 1040 may be installed on the fabrication support 1014. The fabrication support 1014 is lowered and the delivery support 1034 is raised. The roller or wiper 1036 scrapes or otherwise pushes a portion of the build material 1070 from the delivery device 1030 to form the working plane 1016 in the fabrication device 1010. The laser 1060 emits a laser beam 1062, which is directed by the scanner 1040 onto the build material 1070 in the working plane 1016 to selectively fuse the build material 1070 into a cross-sectional layer of the article 1050 according to the design. More specifically, the speed, position, and other operating parameters of the laser beam 1062 are controlled to selectively fuse the powder of the build material 1070 into larger structures by rapidly melting the powder particles that may melt or diffuse into the solid structure below, and subsequently, cool and re-solidify. As such, based on the control of the laser beam 1062, each layer of build material 1070 may include unfused and fused build material 1070 that respectively corresponds to the cross-sectional passages and walls that form the article 1050. In general, the laser beam 1062 is relatively low power to selectively fuse the individual layer of build material 1070. As an example, the laser beam 1062 may have a power of approximately 50 to 500 Watts, although any suitable power may be provided.

Upon completion of a respective layer, the fabrication support 1014 is lowered and the delivery support 1034 is raised. Typically, the fabrication support 1014, and thus the article 1050, does not move in a horizontal plane during this step. The roller or wiper 1036 again pushes a portion of the build material 1070 from the delivery device 1030 to form an additional layer of build material 1070 on the working plane 1016 of the fabrication device 1010. The laser beam 1062 is movably supported relative to the article 1050 and is again controlled to selectively form another cross-sectional layer. As such, the article 1050 is positioned in a bed of build material 1070 as the successive layers are formed such that the unfused and fused material supports subsequent layers. This process is continued according to the modeled design as successive cross-sectional layers are formed into the completed desired portion, e.g., the stator airfoil assembly, or component thereof, of step 920.

The delivery of build material 1070 and movement of the article 1050 in the vertical direction are relatively constant and only the movement of the laser beam 1062 is selectively controlled to provide a simpler and more precise implementation. The localized fusing of the build material 1070 enables more precise placement of fused material to reduce or eliminate the occurrence of over-deposition of material and excessive energy or heat, which may otherwise result in cracking or distortion. The unused and unfused build material 1070 may be reused, thereby further reducing scrap.

Any suitable laser and laser parameters may be used, including considerations with respect to power, laser beam spot size, and scanning velocity. As a general matter, the build material 1070 may be formed by any suitable powder, including powdered metals, such as a stainless steel powder, and alloys and super alloy materials, such as nickel-based or cobalt superalloys. In one exemplary embodiment, the build material 1070 is a high temperature nickel base super alloy such as IN718. In other embodiments, MAR-M-247, IN738, titanium, aluminum, titanium-aluminide, or other suitable alloys may be employed. In general, the powder build material 1070 may be selected for enhanced strength, durability, and useful life, particularly at high temperatures, although as described below, the powder build material 1070 may also be selected based on the intended function of the area being formed.

Returning to FIG. 9, at the completion of step 920, the article, i.e., the stator airfoil assembly, is removed from the additive manufacturing system (e.g., from the DMLF system 1000). In optional step 930, the stator airfoil assembly formed in step 920 may undergo finishing treatments. Finishing treatments may include, for example, aging, annealing, quenching, peening, polishing, hot isostatic pressing (HIP), or coatings. If necessary, the stator airfoil assembly may be machined to final specifications. As noted above, one example of a post-laser fusion process of step 930 is a HIP process in which an encapsulation layer is applied and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS." The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

The method 900 has been discussed above with reference to the formation of a single stator airfoil assembly, or component thereof. However, in one exemplary embodiment of the method 900, more than one stator airfoil assembly (or component thereof) may be manufactured simultaneously. Unless otherwise noted, method 900 in this embodiment proceeds as discussed above. In this embodiment of the method 900, the articles are formed on a common base block (e.g., base block 1040) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

Accordingly, exemplary embodiments may enhance stator airfoil assemblies fabricated with additive manufacturing techniques, including DMLF/DMLS. In particular, the utility, design, durability, manufacturing cost, and life span of the stator airfoil assembly may be improved by manufacturing each portion of the stator airfoil assembly using designs that minimize the structural stresses that will be encountered during operation, especially with the inclusion of the integral airfoil structure, the optimally configured forward and aft flanges, and the optimally configured internal cooling circuits, among others. Additionally, rapid prototyping and manufacturing reduces cracks and other issues and reduces costs and cycle time in the system design, particularly in the iterative environment of gas turbine engine component design.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method of manufacturing a stator airfoil assembly, comprising:
    forming an interior wall of a stator airfoil using an additive manufacturing technique;
    forming an exterior wall of the stator airfoil using the additive manufacturing technique;
    forming a flange over an outer radial wall cooling air opening of the stator airfoil using the additive manufacturing technique, wherein the flange is disposed radially over the opening such that the flange intersects with a radial projection of the opening and such that cooling air flows around the flange to enter into the airfoil; and
    forming a plurality of internal ribs between the interior wall and the exterior wall using the additive manufacturing technique,
    wherein a cooling air circuit is formed in a space between the interior wall and the exterior wall, and
    wherein the interior wall, the exterior wall, and the internal ribs are formed simultaneously as an integral structure by using the additive manufacturing technique.

2. The method of claim 1, wherein the additive manufacturing technique comprises direct metal laser sintering.

3. The method of claim 2, wherein the interior wall, the exterior wall, and the internal ribs are formed of a high-temperature superalloy.

4. The method of claim 1, wherein brazing or welding processes are not employed to form any of the interior wall, the exterior wall, or the internal ribs.

5. The method of claim 1, wherein the flange comprises first, second, and third portions, wherein the first portion is connected with the outer radial wall and extends radially outward and away from the outer radial wall, wherein the second portion is connected with the first portion and extends from an outer radial end of the first portion axially rearward over the stator airfoil so as to pass through the radial projection of the opening, and wherein the third portion is connected with the second portion and extends form an axially rearward end of the second portion radially outward and away from the outer radial wall.

6. A stator airfoil assembly, comprising:
an airfoil exterior wall;
an airfoil interior wall disposed within the airfoil exterior wall and defining a cooling air flowpath between the interior wall and the exterior wall;
a flange disposed over an outer radial wall cooling air opening of the stator airfoil, wherein the flange is disposed radially over the opening such that the flange intersects with a radial projection of the opening and such that cooling air flows around the flange to enter into the airfoil; and
a plurality of internal ribs separating the interior wall from the exterior wall,
wherein the airfoil exterior, the airfoil interior, and the internal ribs are formed as an integral structure without any weld or braze joints connecting the airfoil exterior, the airfoil interior, or the internal ribs.

7. The stator airfoil assembly of claim 6, wherein the airfoil exterior, the airfoil interior, and the internal ribs are formed using an additive manufacturing technique.

8. The stator airfoil assembly of claim 7, wherein the additive manufacturing technique comprises direct metal laser sintering.

9. The stator airfoil assembly of claim 8, wherein the interior wall, the exterior wall, and the internal ribs are formed of a high-temperature superalloy.

10. The stator airfoil assembly of claim 6, wherein the flange comprises first, second, and third portions, wherein the first portion is connected with the outer radial wall and extends radially outward and away from the outer radial wall, wherein the second portion is connected with the first portion and extends from an outer radial end of the first portion axially rearward over the stator airfoil so as to pass through the radial projection of the opening, and wherein the third portion is connected with the second portion and extends form an axially rearward end of the second portion radially outward and away from the outer radial wall.

11. A stator airfoil assembly, comprising:
a hub endwall;
a tip endwall;
an airfoil disposed between the hub endwall and the tip endwall, the tip endwall including an opening to allow cooling air to flow into the airfoil; and
a flange of the tip endwall configured radially over the opening such that cooling air flows around the flange to enter into the airfoil, wherein the flange is disposed over the opening such that the flange intersects with a radial projection of the opening.

12. The stator airfoil assembly of claim 11, wherein the hub endwall, the tip endwall, and the flange are formed as an integral structure without any weld or braze joints.

13. The stator airfoil assembly of claim 12, wherein the hub endwall, the tip endwall, and the flange are formed using an additive manufacturing technique.

14. The stator airfoil assembly of claim 13, wherein the additive manufacturing technique comprises direct metal laser sintering.

15. The stator airfoil assembly of claim 11, wherein the hub endwall, the tip endwall, and the flange are formed of a high-temperature superalloy.

16. The stator airfoil assembly of claim 11, wherein the flange comprises first, second, and third portions, wherein the first portion is connected with the tip end wall and extends radially outward and away from the tip end wall, wherein the second portion is connected with the first portion and extends from an outer radial end of the first portion axially rearward over the stator airfoil so as to pass through the radial projection of the opening, and wherein the third portion is connected with the second portion and extends form an axially rearward end of the second portion radially outward and away from the tip end wall.

* * * * *